United States Patent [19]

Neskora et al.

[11] 3,877,931
[45] Apr. 15, 1975

[54] CONTINUOUS PREPARATION OF PURE METALS BY GASEOUS REDUCTION

[76] Inventors: Daniel R. Neskora, 500 Chautaugua; Cedomir M. Sliepcevich, 2500 Butler Dr.; Robert L. Brown, 1301 Larman Cir., all of Norman, Okla. 73069

[22] Filed: May 13, 1974

[21] Appl. No.: 469,098

Related U.S. Application Data

[63] Continuation-in-part of Ser. No. 381,051, July 20, 1973, Pat. No. 3,833,851, which is a continuation-in-part of Ser. No. 332,679, Feb. 15, 1973, abandoned.

[52] U.S. Cl.............. 75/0.5 AA; 75/.5 A; 75/108; 75/117; 75/118; 75/119
[51] Int. Cl............................................. C22b 23/04
[58] Field of Search......... 75/.5 A, .5 AA, 108, 109, 75/117, 118, 119

[56] References Cited
UNITED STATES PATENTS

| | | | |
|---|---|---|---|
| 2,753,257 | 7/1956 | Nashner et al. | 75/108 |
| 2,836,485 | 5/1958 | Schaufelberger et al. | 75/.5 A |
| 2,867,528 | 1/1959 | Evans | 75/109 |
| 3,761,250 | 9/1973 | Weir et al. | 75/108 |

Primary Examiner—C. Lovell
Assistant Examiner—Arthur J. Steiner
Attorney, Agent, or Firm—Laney, Dougherty, Hessin & Fish

[57] ABSTRACT

A process for continuously recovering metal powders of high purity from aqueous solutions of the salts thereof which comprises conditioning the aqueous solution to attain a selected free ammonia to metal mole ratio in the general range of from 0.0:1 to about 6:1, depending upon the solution used and the metal to be reduced, then continuously passing the solution through a tubular reactor under steady state conditions in modified plug flow in which localized, limited backmixing occurs, while continuously charging a reducing gas to the reactor in countercurrent flow with respect to the solution to agitate the solution as it passes through the reactor, and to continuously reduce selected metal ions to yield insoluble metal powder. A temperature gradient is preferably maintained over at least a portion of the length of the tubular reactor from ambient temperature at the point of charging the leach solution to a temperature preferably exceeding 200°F at a location spaced from the ambient temperature point.

12 Claims, 2 Drawing Figures

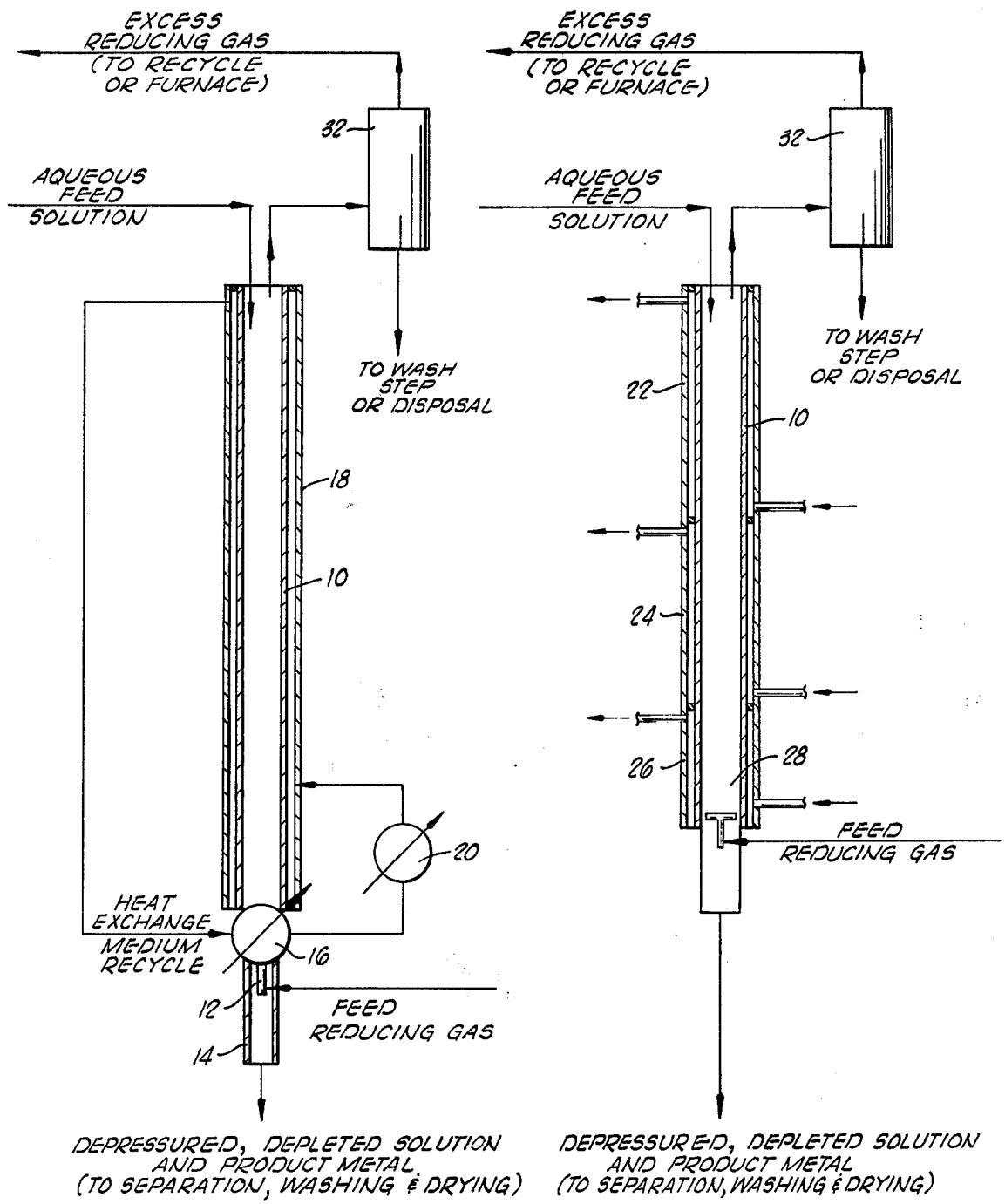

CONTINUOUS PREPARATION OF PURE METALS BY GASEOUS REDUCTION

RELATED APPLICATION

This application is a continuation-in-part of our copending U.S. Pat. application Ser. No. 381,051 filed July 20, 1973 and entitled "Continuous Preparation of Pure Metals by Hydrogen Reduction," now U.S. Pat. No. 3,833,851, assigned to the assignee of the present invention, which application is a continuation-in-part of now abandoned U.S Pat. application Ser. No. 332,679 filed Feb. 15, 1973, and entitled "Continuous Preparation of Pure Metals by Hydrogen Reduction."

BACKGROUND OF THE INVENTION

1. Field of the Invention

This invention relates to the recovery of certain high purity metals from metal-containing ores or raw materials, and particularly to a continuous gaseous reduction process for obtaining relatively pure copper, nickel, cobalt, silver or gold from a solution of the salt or salts or one or more of these metals by reduction with a reducing gas.

2. Brief Description of the Prior Art

Reducing gases, such as hydrogen, sulfur dioxide and carbon monoxide, have been used to treat solutions containing copper, nickel, or certain other metal ions to recover high purity metal powder produced by gaseous reduction. Such gaseous reduction from solution is presently carried out most frequently in an autoclave in a batch or semi-continuous process. A marked improvement with respect to such batch and semi-continuous processing is described in our copending U.S. Pat. application Ser. No. 381,051 directed to a continuous process for producing metallic copper, nickel, cobalt, silver or gold by passing a reducing gas through a tubular reactor in cocurrent flow with a solution of a salt of one or more of these metals. The advantages of the continuous gaseous reduction carried out in a tubular reactor are described in detail in said application.

BRIEF DESCRIPTION OF THE PRESENT INVENTION

We have now determined that certain surprising results are derived from carrying out the continuous reduction in the tubular reactor by passing the reducing gas in countercurrent flow with respect to the treated solution containing the metal values to be recovered. Less of the reducing gas is needed, and both the downstream gas/liquid-solid separator and the heat exchanger for the reducing gas as required in the cocurrent flow procedure can be eliminated. Improved product quality has also been observed.

Broadly described, in the process of the present invention, an aqueous solution containing reduceable copper, nickel, cobalt, silver or gold ions is charged to one end of an elongated tubular reactor and is passed through the reactor in countercurrent flow with respect to a reducing gas. Metal powder produced by the reduction reaction is withdrawn from the tubular reactor at a point downstream from the end of the reactor to which the raw solution containing the unreduced metal values is initially introduced. In the course of the reduction occurring in the tubular reactor, steady state conditions are maintained over the length of the reaction path, and localized backmixing, with modified plug flow, is engendered in the reaction mixture, either by the reducing gas being bubbled therethrough in countercurrent flow, or by this action in combination with suitable static mixing devices. A reducing gas partial pressure of at least 50 psig is maintained in the reactor in conjunction with a total pressure sufficient to prevent boiling of the solution at the temperature prevailing in the reactor. The reactor is operated so that a minimum temperature of at least 200°F is attained by the reaction mixture in traversing the reaction path. The amount of reducing gas employed is in excess of that stoichiometrically required to reduce all of the reduceable metal values present in the solution and sought to be recovered as metal powder.

An object of this invention is to provide a continuous process for the recovery of high-purity metal powder from an aqueous solution by countercurrent contact of the solution with a reducing gas.

A further object of the invention is the continuous reducing of copper, nickel, cobalt, silver or gold ions by passing a leach solution containing one or more of such ions through a tubular reactor in countercurrent flow to a reducing gas.

An important specific object of this invention is to provide for the continuous reduction of copper ions in an aqueous solution by hydrometallurgical reduction in which a lesser amount of feed hydrogen gas is required to effect such reduction on a continuous basis than has been heretofore required.

Additional objects and advantages of the invention will become apparent as the following detailed description of preferred embodiments of the invention are read in conjunction with the accompanying drawings.

BRIEF DESCRIPTION OF THE DRAWINGS

FIG. 1 of the drawings is a schematic flow diagram illustrating the various units employed, and the paths of materials flow used and encountered in one embodiment of the invention.

FIG. 2 of the drawings is a schematic illustration of a multi-staged tubular reactor utilized in a modified embodiment of the invention.

THE FEED SOLUTION

In carrying out the process of the invention, an aqueous solution containing soluble salts of the metals to be recovered is charged to a tubular reactor, preferably at one end thereof. The metals susceptible to recovery by the process include copper, nickel, cobalt, silver and gold. The aqueous solution can be prepared in a number of ways, or derived from several sources. Typically, however, it is a leach solution produced by the acid or ammoniacal leaching of ores containing the described metals. The method by which the aqueous solution is prepared constitutes no part of the present invention, except for such pre-treatment of the aqueous solution prior to charging it to the reactor as is hereinafter described. It should be noted that the feed solution can, and frequently does, contain other dissolved solids than the metal salts of interest, as well as some undissolved entrained solid impurities, such as products of corrosion of the leaching of ores, etc., containing the metal values of interest. This generally does not interfere with the effectiveness of the process.

The Reducing Gas

The metal values carried in solution and to be recovered are reduced by passing a reducing gas continuously through the tubular reactor in countercurrent flow with respect to the aqueous solution. Any of the reducing gases previously used in the batch process recovery of the metals of interest can be used in the present continuous process with varying degrees of effectiveness. Hydrogen constitutes the preferred reducing gas. Problems of toxicity, environmental pollution and production of by-products having limited present marketability render the uses of carbon monoxide, sulfur dioxide and hydrogen sulfide, for example, less suitable than hydrogen.

The Apparatus

The equipment or apparatus used in carrying out the process of the invention broadly includes an elongated tubular reactor, suitable conduits for charging the raw untreated aqueous solution containing the metal ions to be reduced to the tubular reactor at, or near, one end thereof, and suitable conduits or piping for introducing the reducing gas at the other end of the reactor, or at points spaced in the reactor from the point of introduction of the aqueous solution. Finally, the apparatus includes means for heating the reactor to a temperature of at least 200°F at some point or points over its length, and preferably, through the development of a relatively uniform temperature gradient over at least a portion of the length of the reactor, and suitable means for separating the reducing gas from entrained liquid as this mixture emerges from the reactor, and for recovering solid metal product from the depleted aqueous solution upon emergence from the reactor. The apparatus used may further optionally include pumps, heaters and ancillary equipment for pre-treating both the aqueous solution charged to the reactor, and the reducing gas prior to charging it to the reactor. The geometric configuration and orientation of the tubular reactor used is of some importance to the efficient practice of the process of the invention. Preferably, the reactor is a cylindrical member having a length to inside diameter ratio of from about 10:1 to about 200:1, and preferably from about 75:1 to about 125:1. Optimum results are accomplished when the tubular reactor extends substantially vertical, with the aqueous solution being charged to the upper end of the reactor and the reducing gas being introduced to the reactor at a point or points spaced downwardly therefrom.

As will be hereinafter explained, several arrangements or systems can be employed for providing the necessary temperature conditions over the reaction path along the length of the reactor.

Process Conditions

The reducing gas is charged to the tubular reactor in an amount sufficient to provide at least the quantity which is required to stoichiometrically react with all of the metal ions which are present in the solution and are to be reduced and recovered as powdered metal. An amount which exceeds by 25 percent the stoichiometric requirement is more than adequate in most instances. The reducing gas utilized is generally less than that employed in the cocurrent flow process described in our application Ser. No. 381,051 because in countercurrent flow, the reducing gas is not used to entrain and carry the product solids, as will be hereinafter described in greater detail.

The partial pressure of the reducing gas in the reactor is at least 50 psig, and a total pressure is maintained sufficient to prevent the aqueous solution from boiling. Although very high pressures can be employed in the reactor, a maximum pressure of from about 500 psig to about 700 psig will be employed for most recoveries.

The reactor is heated so that a temperature of at least 200°F is attained by the solution prior to its discharge from the reactor. The reactor can be operated isothermally at a uniform temperature of at least 200°F, but a temperature gradient is preferably established over at least a portion of the length of the reactor, with ambient temperature at the point at which the aqueous solution is charged, and gradually increasing temperature up to at least 200°F, and preferably about 550°F. The most effective mode of operation entails providing a temperature gradient from ambient temperature at the feed solution inlet, increasing to about 400°F – 500°F at a point about midway of the length of the reaction path. The remaining length of the reaction path is then maintained at a temperature of from about 400° – 500°F. At the end of the reaction path, the temperature is decreased to a temperature of from about 100°F to about 150°F at the point in the reactor where the spent solution is discharged and reducing gas is introduced. In this multiple stage operation, two separate reactor heaters are usually employed. It should be noted that as here employed, the term "reaction path" is defined as being that zone in the tubular reactor where the reducing gas and the aqueous solution are in direct contact, and such path is not necessarily coextensive with the length of the tubular reactor.

The described multiple stage heating and cooling operation overcomes localized, rapid expansion of the reducing gas introduced at ambient temperature which causes excessive turbulence resulting from contact with the hot spent solution, and also reduces flashing of the depleted solution associated with its depressurization and removal from the system. Also, this type of operation allows the temperature at the point of discharge of the solution from the reactor to be controlled more closely than can be achieved by single-stage heating over the entire length. The maximum temperature requirement in the system is also lower where the two stage heating is used than where the increasing gradient is extended over the entire reactor length. By having the downstream portion of the reaction path maintained at the same or a slightly reduced temperature, the residence time of the reactants and the time at which the liquid and gaseous reaction mixtures is kept at reaction temperature are increased. These increases allow adequate conversions to metallic product to be realized at lowered reactor discharge temperatures.

As with the cocurrent continuous gas reduction described in our U.S. application Ser. No. 381,051, the continuous countercurrent process is carried out under steady state conditions, and the flow rates of solution and reducing gas through the reactor are regulated to achieve modified plug flow of the solution with localized, limited backmixing occurring therein. The reaction mixture is of heterogeneous character over the length of the reactor as its composition is changed by the progressive reaction with the reducing gas and the formation of small particles of the solid metal product. The teachings and disclosure of our cited copending application afford further detail on this aspect of the invention, and are incorporated herein by reference.

An advantage of the countercurrent system is that, where the reactor is operated non-isothermally, the tail gas from the reactor is cooled by the incoming feed solution, and the gas is discharged from the reactor at substantially ambient temperature and can therefore be passed directly to a knock-out drum to remove liquids, and then compressed for recycling to the process. Optionally, the discharged reducing gas can, in the case of some reducing gases, be passed to dryers in which the metal powder product is dried to provide an inert atmosphere, or, in the case of hydrogen, it can be burned as a fuel for the drying chambers.

In the preferred method utilizing the tubular reactor, it is extended substantially vertically, the feed solution is introduced to the top of the reactor and the reducing gas is charged to the bottom of the reactor, both at substantially ambient temperature. The gas bubbles upwardly in the reactor countercurrent to the downflowing feed solution. As the increasingly heated gas contacts the metal ions, they react with the gas to produce very finely divided particles of metal. The particles increase in size and fall to the bottom of the reactor, where they are continuously cooled and removed. The residence time in the reactor is short enough that the particles do not agglomerate, but remain in the form of a fine powder. Since in this mode of operation, the solid metal particles are moved to the point of discharge from the reactor by gravity, the increased quantity and flow rate of reducing gas which must characteristically be used in cocurrent flow recoveries is not required. The solid particles of product metal and spent solution, retaining heat from transit through the reactor, can advantageously be discharged through an outlet tube or extension of the reactor which is in heat exchange relation to the reducing gas being charged to the reactor. In this way, the reducing gas is warmed and the product metal and spent solution are cooled, thus facilitating the subsequent recovery steps. Alternatively, the depleted solution and solid metal particles may be passed in heat exchange relation to a heat exchange fluid which in turn may be used to provide heat for other portions of the system.

Although in general, the raw or feed aqueous solution can be beneficially pre-treated with ammonia to a specified free ammonia to metal ion mole ratio (as described in detail in our copending U.S. Pat. application Ser. No. 381,051), we have determined that, in the case of recovery of some metals, one of the primary objectives of such pre-treatment can be realized without the necessity of pre-treating the feed. It was previously supposed that the pre-treatment was necessary to control undesirable hydrolysis reactions resulting in the production of metal salts, such as basic copper sulfates, their deposition in the reactor and their contamination of the metallic product. We have determined that with aqueous solutions of copper, if these be made strongly acidic (a pH of not more than about 2), hydrolysis does not occur. Strong acidification of silver and gold solutions is also beneficial in this respect. Therefore, whether or not pre-treatment in the form of pH adjustment and adjustment of the free ammonia to metal ion mole ratio is required will depend on the particular feed being run.

Where ammonia pre-treatment is used, it should be similar to the treatment described in our copending application for cocurrent continuous recovery of the described metals. Where copper solutions are pre-treated, the free ammonia to copper ion ratio is adjusted by ammonia or acid addition (in the case of ammoniacal leach solution) to from about 0.1:1 to about 1.6:1, and the pH is maintained at less than about 7.0. In nickel and cobalt reductions, the ammonia to metal ion mole ratio in the feed solution is adjusted to from about 1.25:1 to about 6:1, and a catalytic or heteronucleating agent is added to the solution in order to achieve a satisfactory reaction rate. Silver and gold can be recovered from aqueous solutions having a very low pH, and silver can also be recovered at pH values up to 11.5. Silver solutions are preferably pre-treated with ammonia to provide a free ammonia to silver mole ratio of about 0.5–4.5. Where the ammonia pre-treatment step can be eliminated by strong acidification, the need for auxiliary pre-treating equipment is eliminated, as is the need for facilities to recover and handle the by-product.

The flow of materials in the process of the invention, and the major components of the apparatus utilized, are schematically illustrated in the accompanying drawing. In the illustrated arrangement, a strongly acidic leach solution is being utilized as the source of metal values to be recovered, and in view of the acidity, no pre-treatment is required and no pre-treating equipment or components are illustrated in the system. The feed solution enters the top of an elongated tubular reactor 10 which extends substantially vertically, and flows downwardly by gravity through the reactor. Reducing gas is charged to the lower end of the tubular reactor via a charging conduit 12 which extends concentrically inside an effluent discharge conduit 14. Both reducing gas and depleted solution pass through a product cooler and heat exchanger device 16 which facilitates heat exchange between a relatively cool heat exchange medium, used in a manner hereinafter described for heating the tubular reactor, and the product solids and spent solution discharged from the reactor. It should also be noted that in charging the gas to the reactor through a conduit which is concentrically located with respect to the effluent discharge conduit, the reducing gas is warmed before it enters the reactor by the relatively warm effluent. The spent or depleted solution and the particles of product metal discharged from the reactor are passed to a separations unit for recovering the metal, then to a washing step and ultimately to a drying zone.

The tubular reactor 10 is heated in the manner hereinbefore described to provide a temperature at some location in the reactor which is at least 200°F. In the illustrated embodiment of the invention, single stage heating is provided for establishing a uniform temperature gradient ranging from ambient temperature at the upper end of the reactor to about 600°F at the lower end of the reactor. The heating system includes a jacket 18 surrounding the tubular reactor over a major portion of its length and a conduit for recycling the heat exchange medium via the heat exchanger 16 and a make-up heater 20 to the lower end of the reactor 10.

Alternatively, and preferably, as illustrated in FIG. 2, two stage heating may be used in conjunction with the tubular reactor 10, with a first stage jacekt 22 providing a temperature gradient of from ambient temperature at the upper end of the reactor to a temperature of from about 400°F to about 600°F at about the mid point of the reactor, followed by a second stage provided by a jacket 24 which surrounds the portion of the reactor below the jacket 22. A heat exchange medium is circulated in the jacket 24 to provide either a constant temperature of around 400°F, or a decreasing temperature gradient of from about 400°F to 600°F at the mid point of the reactor to a temperature of about 300°F at that portion of the reactor adjacent the lower end of the jacket 24.

It has been determined that when the system depicted in FIG. 1 is utilized for cooling the spent solution and solid product discharged from the reactor 10, constrictions in the cooling assembly and valving in the cooling assembly, coupled with the inherent rapid cooling encountered upon discharge, have apparently caused some hang-up or retention of solid product in the valving and cooling assembly. The multi-stage system depicted in FIG. 2 alleviates the described problem to a significant degree. As here illustrated, a cooling jacket 26 is provided around the lower end of the tubular reactor 10, and continues the cooling of the spent solution and solid product before the mixture is discharged from the reactor. The effluent is then passed directly to the separation, washing and drying stages of the process. In this arrangement, the reducing gas is introduced substantially directly into the lower end of the reactor 10, and is preferably admitted through an annular, perforated manifold 28 which charges the gas to the reactor at a number of spaced points in the lower end thereof.

In either structural arrangement utilized for carrying out the process of the present invention, the tail gas, consisting essentially of unused reducing gas, is passed from the top of the tubular reactor and into a liquid knock-out drum 32 where entrained liquid from the reactor is removed from the reducing gas. The liquid is disposed of in any suitable manner, and the relatively dry reducing gas can then be recycled, or, if combustible, supplied to a furnace to provide a part of the heat required in the process.

In the equipment provided for handling and conveying the spent solution product, an inert atmosphere is preferably employed over the solid product to prevent oxidation of the product and to enhance and extend the effective shelf life of the pure metallic powder.

A series of continuous reduction runs using the described countercurrent flow were carried out on acidic solutions of cupric sulfate. These solutions included both actual leach solutions and synthetic solutions. The reductions were effected in two tubular reactors having differing diametric and length dimensions. The conditions utilized in the runs, and the results obtained were as follows:

CONTINUOUS REDUCTION OF CUPRIC SULFATE SOLUTIONS IN THE COUNTERCURRENT-FLOW TUBULAR REACTOR

| | Reactor No. 1 (¾" × 60") | | | | | | | | | Reactor No. 2 (1" × 72") | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| [Cu$^{++}$] g/l | 43.2 | 43.2 | 52.5 | 16.5 | 36.8 | 45.9 | 45.9 | 20.8 | 16.5 | 55.7 | 54.8 | 9.1 | 9.3 |
| Liquid Feed Rate (g/min) | 69.0 | 69.0 | 67.0 | 58.9 | 58.4 | 65.9 | 45.9 | 43.3 | 43.3 | 81.1 | 73.9 | 108.8 | 54.6 |
| H$_2$ Feed Rate (SCFM) | 0.076 | 0.076 | 0.054 | 0.054 | 0.054 | 0.045 | 0.047 | 0.022 | 0.023 | 0.056 | 0.044 | 0.020 | 0.020 |
| Reactor Pressure, psig | 601 | 642 | 703 | 699 | 701 | 706 | 704 | 711 | 714 | 703 | 704 | 711 | 707 |
| Reactor Temp., °F* | | | | | | | | | | | | | |
| (a) 4" from top | 495 | 602 | 571 | 517 | 524 | 83 | 233 | 154 | 331 | 222 | 445 | 323 | 255 |
| (b) 29" from top** | 525 | 532 | 541 | 518 | 531 | 428 | 475 | 471 | 483 | 420 | 534 | 449 | 476 |
| (c) 59'''' from top | 523 | 532 | 548 | 515 | 532 | 355 | 367 | 373 | 376 | 445 | 492 | 454 | 474 |
| (d) average | 517 | 550 | 550 | 517 | 530 | 324 | 388 | 367 | 418 | 377 | 501 | 419 | 421 |
| Residence Time, Minutes | 1.78 | 1.78 | 1.92 | 1.89 | 2.04 | 2.27 | 2.87 | 3.51 | 3.51 | 3.89 | 4.25 | 3.11 | 3.85 |
| Percent Conversion of Cu$^{++}$ | 73.7 | 74.3 | 52.5 | 53.2 | 66.1 | 35.4 | 70 | 54.0 | 68 | 41.5 | 54.1 | 51.3 | 64.5 |
| pH of Liquid Feed | 1.93 | 1.96 | — | 0.31 | 0.3 | 0.3 | 0.3 | 0.3 | 0.31 | 0.21 | 0.26 | 2.08 | — |

*Reactor temperatures a, b and c are reactor skin temperatures.
**In the runs carried out in the 1" diameter reactor, the b thermocouple was placed to measure the skin temperature 33 inches from the top of the reactor.

Although certain preferred embodiments of the present invention have been herein described, it will be understood that various changes in the structural elements employed and in the process conditions can be effected without departure from the basic principles of the invention. Changes of this type are therefore deemed to be circumscribed by the spirit and scope of the invention except as the same may be necessarily limited by the appended claims or reasonable equivalents thereof.

What is claimed is:

1. In a process for continuously recovering metallic copper, nickel, cobalt, silver or gold from an aqueous solution containing a soluble salt of one or more of these metals, and having a selected pH and a selected free ammonia-to-metal ratio ranging from 0:1 up to about 6:1, depending upon the metal to be recovered, by continuously mixing the solution with a reducing gas in a tubular reactor, the improvement which comprises:

continuously charging the solution and any needed particulate catalyst to a tubular reactor while simultaneously introducing a reducing gas to said reactor at a point spaced from the point at which the solution is charged to the reactor in a flow direction countercurrent to the flow direction of the solution;

heating the mixture of the solution and the gas to a temperature of at least 200°F prior to passing out of the reactor, said reactor being maintained, during the charging of the solution and introduction of the gas, under substantially steady state conditions in which
- a. the partial pressure of the reducing gas is at least 50 psig, and the total pressure on the solution is sufficient to prevent boiling of the solution;
- b. the quantity of reducing gas passed through the reactor countercurrently with the aqueous solution is in excess of that required for stoichiometric reduction of the metal values to be recovered and in sufficient quantity and flow rate to agitate the mixture to a state of modified plug flow in which localized, limited backmixing occurs, and in which
- c. the mixture is of heterogeneous character over the length of the reactor; then separating the metal powder to be recovered from the effluent mixture of spent solution and solids discharged from the reactor.

2. A process as defined in claim 1 wherein the reducing gas is selected from the group consisting of hydrogen, carbon monoxide, sulfur dioxide and hydrogen sulfide.

3. The process as defined in claim 1 wherein the aqueous solution is charged to the reactor at ambient temperature, and a constantly increasing thermal gradient is maintained in the reactor during its steady state operation from the first point therein at which the solution is charged to a second point therein spaced in the reactor toward the point of discharge of spent solution and product metal therefrom.

4. The process defined in claim 1 wherein the tubular reactor is operated isothermally over its length at a temperature exceeding 200°F.

5. The process defined in claim 1 wherein the reactor has a length to diameter ratio of at least 10:1.

6. The process defined in claim 1 wherein said reactor extends vertically, said solution is charged to the upper end of said reactor and said reducing gas is charged to the lower end of said reactor.

7. The process defined in claim 2 wherein the reducing gas employed is hydrogen.

8. The process defined in claim 4 wherein the maximum temperature in said thermal gradient is about half the distance from said first point to said point of discharge of said spent solution and product from said tubular reactor.

9. The process defined in claim 4 wherein the temperature at the point of discharge of spent solution and product from the reactor does not exceed 200°F.

10. The process defined in claim 8 wherein a constantly decreasing temperature gradient is maintained in the reactor from said second point to the point of discharge of spent solution and product metal therefrom.

11. A process as defined in claim 1 wherein said metal to be recovered is selected from the group consisting of copper, silver and gold, and the pH of the aqueous solution is adjusted to less than about 2.0.

12. A process as defined in claim 1 wherein the metal to be recovered is selected from the group consisting of nickel and cobalt, and wherein the pH of said aqueous solution is adjusted to from about 7 to about 12, and the free ammonia to metal ratio thereof is adjusted to from about 1.25:1 to about 6:1, and a catalyst for heterogeneous gaseous reduction of the metal to be recovered is added to said adjusted solution.

* * * * *